US010205694B2

(12) United States Patent
Bastide et al.

(10) Patent No.: US 10,205,694 B2
(45) Date of Patent: *Feb. 12, 2019

(54) DYNAMIC INCLUSION THRESHOLDS FOR SOCIAL NETWORK CONVERSATIONS

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US); Dale M. Schultz, Limerick, ME (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,596

(22) Filed: Jul. 21, 2017

(65) Prior Publication Data

US 2017/0324690 A1  Nov. 9, 2017

Related U.S. Application Data

(63) Continuation of application No. 14/709,053, filed on May 11, 2015, now Pat. No. 9,756,003.

(51) Int. Cl.
*H04L 12/58* (2006.01)
*H04L 29/08* (2006.01)

(52) U.S. Cl.
CPC ............. *H04L 51/12* (2013.01); *H04L 51/00* (2013.01); *H04L 51/04* (2013.01); *H04L 51/14* (2013.01);
(Continued)

(58) Field of Classification Search
CPC ......... H04L 51/00; H04L 51/04; H04L 51/14; H04L 51/26; H04L 51/32; H04L 65/4084;
(Continued)

(56) References Cited

U.S. PATENT DOCUMENTS 8,271,516 B2  9/2012  Gounares et al.
8,676,887 B2  3/2014  Kim et al.
(Continued)

OTHER PUBLICATIONS

United States Patent and Trademark Office, Notice of Allowance for U.S. Appl. No. 14/709,053, dated Apr. 27, 2017, pp. 1-11, Alexandria, VA, USA.
IBM, List of IBM Patents or Patent Applications Treated as Related, Applicant Appendix, Jul. 21, 2017, pp. 1-2, the contents of which are incorporated herein by reference in their entirety.
Author Unknown, System and Method to automatically identify appropriate social network recipients for a post based on content and prior user behavior, IP Disclosure No. IPCOM000229415D, Jul. 28, 2013, pp. 1-3, IP.com, Published online at: www.ip.com/IPCOM/000229415D.
(Continued)

*Primary Examiner* — Le H Luu
(74) *Attorney, Agent, or Firm* — Lee Law, PLLC; Christopher B. Lee

(57) ABSTRACT

A social network conversation dynamic inclusion threshold causes a first subset of social network group members of a social network group to be included in a social network conversation earlier than at least one other social network group member. In accordance with the social network conversation dynamic inclusion threshold, social network posts of the social network conversation are distributed to the first subset of social network group members while delaying distribution of the social network posts of the social network conversation to the at least one other social network group member. Upon satisfaction of the social network conversation dynamic inclusion threshold, the social network posts of the social network conversation are distributed to the at least one other social network group member.

20 Claims, 5 Drawing Sheets

(52) U.S. Cl.
CPC .............. *H04L 51/26* (2013.01); *H04L 51/32* (2013.01); *H04L 67/1053* (2013.01)

(58) Field of Classification Search
CPC .... H04L 41/04; H04N 21/25; G06Q 30/0631; G06Q 30/02; G06Q 30/00; G06Q 10/10; G06F 3/1454; G06F 17/30699
See application file for complete search history.

(56) References Cited

U.S. PATENT DOCUMENTS

| | | | |
|---|---|---|---|
| 8,825,777 | B2 | 9/2014 | DeLuca et al. |
| 2008/0094312 | A1* | 4/2008 | Feigenbaum ......... G06F 3/1454 345/2.2 |
| 2010/0070485 | A1 | 3/2010 | Parsons et al. |
| 2010/0325107 | A1* | 12/2010 | Kenton ................. G06Q 30/00 707/723 |
| 2012/0179752 | A1* | 7/2012 | Mosley ................. G06Q 10/10 709/204 |
| 2013/0138749 | A1* | 5/2013 | Bohm .................... H04L 51/32 709/206 |
| 2013/0340089 | A1* | 12/2013 | Steinberg ............... H04L 63/10 726/27 |
| 2014/0068692 | A1* | 3/2014 | Archibong .......... H04L 65/4084 725/116 |
| 2014/0075004 | A1* | 3/2014 | Van Dusen ............. H04L 41/04 709/223 |
| 2014/0162241 | A1* | 6/2014 | Morgia .................. G06Q 30/02 434/362 |
| 2014/0173648 | A1* | 6/2014 | Ball ....................... H04N 21/25 725/25 |
| 2015/0088684 | A1* | 3/2015 | Nygaard ............ G06Q 30/0631 705/26.7 |
| 2015/0120717 | A1* | 4/2015 | Kim ................... G06F 17/30699 707/727 |
| 2016/0337286 | A1 | 11/2016 | Bastide et al. |

OTHER PUBLICATIONS

Edward A. Mabry, Framing Flames: The structure of argmentative messages on the net, Journal of Computer-Mediated Communication, Mar. 1997, pp. 1-16 (as printed), vol. 2, Issue 4, John Wiley & Sons, Inc., Published online at: http://onlinelibrary.wiley.com/doi/10.1111/j.1083-6101.1997.tb00193.x/full.

Author Unknown, Natural language processing, Wikipedia, Printed from website on May 4, 2015, pp. 1-11, Wikimedia Foundation, Inc., Published online at: http://en.wikipedia.org/wiki/Natural_language_processing.

Author Unknown, IBM SPSS Statistics, Software Product Overview, Printed from website on May 4, 2015, pp. 1-2, IBM Corporation, Published online at: http://www-01.ibm.com/software/analytics/spss/products/statistics/.

Author Unknown, IBM SPSS Text Analytics for Surveys, Software Product Overview, Printed from website on May 4, 2015, pp. 1-2, IBM Corporation, Published online at: http://www-01.ibm.com/software/analytics/spss/products/statistics/text-analytics-for-surveys/.

Author Unknown, Actiance: Vantage for IBM Connections, Website with Product Datasheet, Printed from website on May 5, 2015, pp. 1-3, Actiance, Inc., Published online at: https://www.actiance.com/content/vantage-ibm-connections.

Pamela Hunter, Margin of Error and Confidence Levels Made Simple, Website/page: isixsigma.com, Printed from website on May 4, 2015, pp. 1-3, Published online at: http://www.isixsigma.com/tools-templates/sampling-data/margin-error-and-confidence-levels-made-simple/.

Author Unknown, confidence level, Definition by The Free Dictionary, Printed from website on May 4, 2015, p. 1, Farlex, Inc., Published online at: http://www.thefreedictionary.com/confidence+level.

* cited by examiner

DYNAMIC INCLUSION THRESHOLDS FOR SOCIAL NETWORK CONVERSATIONS

BACKGROUND

The present invention relates to social network communications. More particularly, the present invention relates to dynamic inclusion thresholds for social network conversations.

Social networks provide social network users with a way to communicate with one another in an online environment. The social network users may share photographs and stories, and may communicate with each other within the social network environment.

SUMMARY

A computer-implemented method includes: distributing, in accordance with a social network conversation dynamic inclusion threshold that causes a first subset of social network group members of a social network group to be included in a social network conversation earlier than at least one other social network group member, social network posts of the social network conversation to the first subset of social network group members while delaying distribution of the social network posts of the social network conversation to the at least one other social network group member; and distributing, in response to satisfaction of the social network conversation dynamic inclusion threshold, the social network posts of the social network conversation to the at least one other social network group member.

A system that performs the method and a computer program product that causes a computer to perform the method are also described.

DETAILED DESCRIPTION

Figure 1:
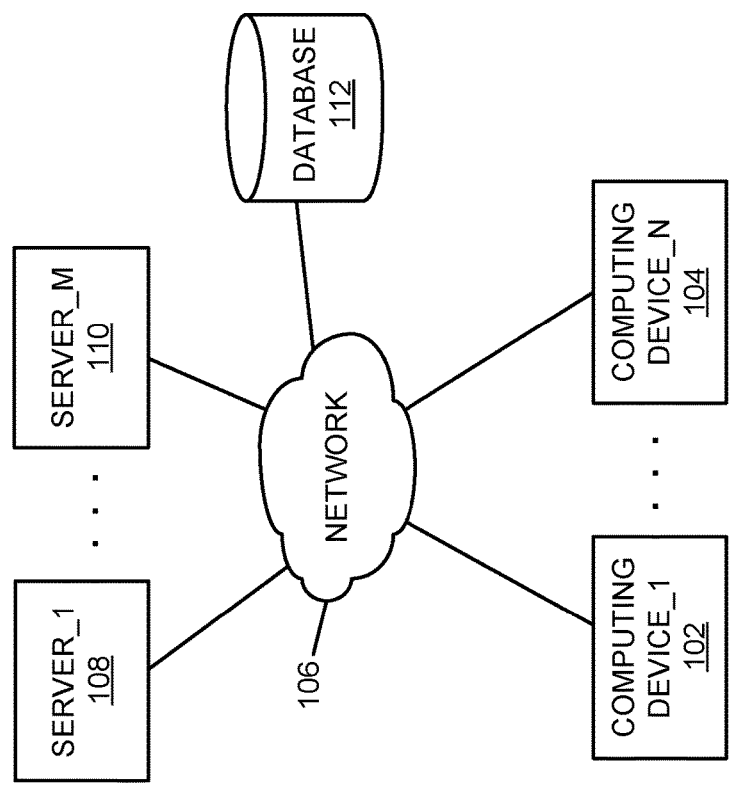
FIG. 1 is a block diagram of an example of an implementation of a system for dynamic inclusion thresholds for social network conversations according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides dynamic inclusion thresholds for social network conversations. The technology described herein solves a recognized social network conversation problem by providing a new form of computing technology that dynamically includes social network users within social network conversations over time in accordance with social network conversation dynamic inclusion thresholds. The social network conversation problem was recognized as resulting from online communications lacking face-to-face feedback of how commentary is perceived by other group members. As a consequence certain social network group members may not post their contributions to social network conversations to avoid perceived contradiction of other members. This social network conversation problem was recognized to be compounded in circumstances where certain styles of commentary (e.g., a strong positive or negative opinion) are expressed by the other members early in an online conversation. This dynamic of social network conversations was determined to cause conversations to terminate earlier than they otherwise would terminate, with a coincident lack of sufficient diversity and objectivity of perspective to provide objective value to social network groups as a whole.

To solve this recognized problem, and to enhance diversity and objectivity of perspective in social network conversations, the present technology provides social network conversation dynamic inclusion thresholds (hereinafter "dynamic inclusion thresholds" for ease of reference). The dynamic inclusion thresholds may be configured to programmatically provide certain identified social network group members that otherwise may not contribute to social network conversations with an opportunity to contribute and be included in online conversations by delaying delivery of social network posts to social network group members that historically post commentary that may lack objective contribution/assistance to other members of the social network group. As such, the dynamic inclusion thresholds perform a dual role of operating to dynamically "include" members of social network groups that otherwise may not contribute to social network conversations, and by also contemporaneously operating to dynamically "include" members with particular styles of historical communication patterns to conversations over time. Both forms of inclusion may be dynamically adjusted in real time as social network conversations unfold within a social network. Accordingly, the present technology may facilitate more balanced, objective, and comprehensive social network conversations with an increased diversity of participants, commentary, and perspective.

In operation, a social network conversation dynamic inclusion threshold is obtained that causes a first subset of social network group members to be included in a social network conversation earlier than at least one other social network group member and that further causes the at least one other social network group member to be included in the social network conversation responsive to satisfaction of the configured social network dynamic inclusion threshold. In accordance with the configured social network conversation dynamic inclusion threshold, social network posts of the social network conversation are contemporaneously delivered to the first subset of social network group members while delivery is delayed to the at least one other social network group member. In response to satisfaction of the social network conversation dynamic inclusion threshold, the social network posts of the social network conversation are distributed to the at least one other social network group member.

The social network group members for which delivery of posts is delayed may be determined, for example by text analysis of social network conversations over time, to express a particular style of commentary (e.g., a strong opinion, un-objective commentary, etc.) that is also determined over time, again such as by text analysis of social network conversations, to deter commentary and contribution from other group members. The dynamic inclusion thresholds allow these other social network group members that first receive the social network posts to contribute to social network conversations without feeling like the conversation is already concluded and without feeling that commentary may be perceived as contradicting strong opinions of others expressed earlier in the online conversation. The social network group member with the particular style of commentary may be included in social network conversations after the configured dynamic inclusion threshold is satisfied or expired to ensure that all social network group members have an opportunity to contribute to the online conversation.

As described above and in more detail below, social network conversations of a social network group may be analyzed over time to recognize patterns of both communication and non-communication responsive to commentary by other group members. Trends of response rates may also be analyzed, such as response rates of social network users relative to one another. For example, the present technology may determine by analysis of social network conversations that certain social network group members contribute to conversations when provided with a reasonable opportunity (e.g., time period or other criteria) to contribute, but that these same social network group members do not contribute if a particular style of perspective has already been expressed/communicated. In such a circumstance, the present technology may infer that these social network group members interpret the conversation to be concluded or that commentary may be perceived as contradicting opinions of other, and may further infer that the group member with the particular style of perspective may feel a need to reiterate their perspective if any other commentary is added to the conversation. While this is a delicate situation among social network group members, the present technology operates programmatically to mitigate these types of potentially unintentional interactions that may be perceived to actually inhibit open communication and participation within social network groups over time. As such, the present technology implements the dynamic inclusion thresholds to attempt to foster and build coherence and to strengthen social network groups over time by ensuring that all group members have a chance to express their opinions and comment on issues that are relevant to the particular social network group.

As introduced above, a particular social network group member that, for example, dominates social network conversations may be inferred/determined by analytical recognition that other social network group members contribute to the social network conversations less often when the particular social network group member contributes with a particular style of commentary (e.g., such as by contributing early in the conversation with a positive or negative strong opinion). This tendency to express strong opinions earlier in conversations may be exacerbated where the dominant social network group member is online more often than other group members.

A social network conversation dynamic inclusion threshold may be configured that causes certain social network group members to be included earlier in future online conversations and that causes other social network group members to be included later in conversations (e.g., particular members may be deferred from initial inclusion in a future online conversation). As such, the present technology allows other social network group members to have an opportunity to contribute to the conversation before the conversation appears objectively to have been concluded without the added value of their contribution(s). Distribution of social network posts associated with the social network conversation may be deferred from delivery to the particular social network group member with stronger opinions in accordance with a configured social network conversation dynamic inclusion threshold, while the social network posts are delivered to other social network group members to provide them with an opportunity to contribute where they may not otherwise contribute if a strong opinion had been expressed early in the online conversation.

The social network posts associated with the social network conversation may be delivered to the particular social network group member in response to satisfaction or expiration of the social network conversation dynamic inclusion threshold, at which time the particular social network group member may contribute that user's particular style of commentary without squelching the conversation among the group. This form of dynamic inclusion of the particular social network group member further fosters a recognition among the social network group that the opinions and commentary of that particular social network group member are valued among the group, with the recognition that group members of stronger opinion should still embrace the opportunity to communicate with the group, whether earlier or later in a particular conversation.

An ordering of distribution of social network posts may be controlled within a social network to ensure that a balanced set of responses are available to users that post inquiries or comments within a social network. The present technology evaluates members of an online social network, and response histories of the respective members. Responsive to detection of a new post, the post is intercepted and a distribution list is created for the post in accordance with the members of the social network group. A first intended candidate subset of members of the group on the distribution list is selected in accordance with a configured dynamic inclusion threshold, and the post may be initially distributed to the selected subset of members of the group. The selected subset may be derived based upon members from which historical responses are determined to be lacking due potentially to dominant responses from other members of the group, based upon users being involved primarily with different aspects of a subject matter area within the group, or based upon other criteria as appropriate for a given implementation. The conversation (e.g., set of responses) may be monitored and compared to a dynamic inclusion threshold. When the conversation reaches a target point of diversity of opinion, time, or other factors that are configured for the dynamic inclusion threshold, such as responses appearing from the initial subset of members, the visibility of the post/conversation may be expanded to include more members of the social network group. Over time, other members of the group may be added from the distribution list and the post may be distributed to the added members for comment and/or response until all members have had a chance to view the post and comment and/or respond. As such, the dynamic inclusion thresholds may be altered over time, which allow other people to also be included in the conversation. By time shifting the potential for inclusion of stronger opinions to later in social network conversations, the present technology may provide more incentive to group members that are online less often to contribute to social network conversations.

The mixture of social network group members included in a social network conversation may include members with both positive and negative opinions, different interests, and other diversity of expressions, that are incorporated into the responses in a dynamic and systematic manner over time. The present technology may perform real-time monitoring and text analysis of social network conversations to determine whether differing opinions have been sufficiently expressed by a subset of members to reasonably diversify the particular conversation. The dynamic inclusion thresholds may be adjusted in real time in response to text analytics of the social network conversations. As such, where a particular user has been deferred from initial inclusion in a conversation, that particular user may be added to the conversation in response to analysis of the content of the conversation and the diversity of commentary that has already occurred in the conversation.

This commentary mixture over time allows more passive or neutral participants that may otherwise not participate at all in conversations to observe diversity of opinion (rather than one-sided commentary) that may attract commentary from those participants, and that may further allow those participants to contribute earlier in conversations, while still including participants with stronger opinions (positive or negative, and that would likely participate regardless of timing) to participate later in a conversation. Further, the timing of inclusion of group members may be dynamically adjusted as conversations unfold in a social network environment.

The present technology may leverage streamed post distribution techniques or hide date/time stamps to mask the inclusion thresholds so that all users appear to have a balanced opportunity to present their commentary. As such, the present technology allows social network conversations to be developed with a balanced set of opinions being expressed for consideration by the person that initiated the post, rather than just receiving one-sided responses (again either positive or negative).

The dynamic inclusion thresholds may be based upon a variety of different dynamic inclusion criteria. For example, the dynamic inclusion criteria may include an elapsed amount of time (e.g., a timeout, such as one minute, one hour, one day, etc.). Additional and/or alternative dynamic inclusion criteria may include quality and diversity of opinions expressed within responses, sentiment of responses, attainment of a meta-threshold (e.g., quantity of responses, such as that there have been ten new posts, specific social network group members have joined the conversation, etc.), a number of responses or rate of responses increasing or decreasing (e.g., a detected positive or negative change in a rate of responses), a sentiment threshold (more positive responses than negative responses, etc.), subject matter drift, negativity tolerance criteria, age of posts, thread size, or other threshold, as appropriate for a given implementation. The dynamic inclusion thresholds may be implemented as a combination of the various dynamic inclusion criteria. Further, many different forms of dynamic inclusion criteria are possible and all such possibilities are considered within the scope of the present technology.

The dynamic inclusion thresholds may be configured as dynamic inclusion rules that are evaluated in response to each post or each set of posts to a particular online conversation. The dynamic inclusion rules may be formed based upon, for example, the following criteria: "Include people with interest profiles that match subject X initially, and after 2 hours also include people with interest profiles that match subject Y." Alternatively, the dynamic inclusion rules may be formed based upon, for example, the following criteria: "Include people that contribute less often initially, and after ten posts have been generated include other group members." Many other variations of dynamic inclusion rules are possible, and all such variations are considered to be within the scope of the present technology.

The present technology may also apply to any electronic mail client. As such, electronic mail messages may also be processed as otherwise described herein with respect to social network posts.

Several additional aspects of the present technology relating to the inclusion or exclusion thresholds are described below, and each may be implemented as appropriate for a given implementation. For example, a request to repost or share the contents of a post may be detected, and because a reposting or sharing of the content may make the full post available for all to see without use of the technology described herein, the same access rules as utilized during the initial postings may be applied to the new post. The present technology may be activated only on peer review around social/collaborative artifacts. Further, a voting system may be implemented that allows participants to vote on whether to make the post visible to a wider audience, thus by majority (or other threshold vote) those who were previously excluded from the discussion thread may be included by consensus.

The technology described herein may be applied to sets of social network group members by combining multiple users' social network responses and/or commentaries. A system may be implemented to include sentiment metrics between pairs of users in the social network.

It should be noted that additional members may be added from the social network into a conversation randomly. Additionally, a user interface selection may be provided to allow marking of a conversation as complete or ready for full distribution.

A negative or positive perception within subsets of responses may also be identified and displayed. For example, if a social network user is interested in providing a comment on a hotel, the user may selectively see what other reviews have been posted with a similar sentiment of the post the user is interested in providing, which may assist with further enhancing diversity of commentary by allowing the user to augment, rather than repeat, the other postings of similar sentiment.

Further regarding response histories of the respective members, users may be added initially to the distribution list from a top percentage level (e.g., top quartile or other histogram) based upon their historical responses. Users may be added to the distribution of a response over time by adjusting the percentage level of users to be included in the distribution.

Users may additionally be added for distribution over time (e.g., initial distribution versus additional recipients) by use of a statistical confidence level in an expected form of response to a particular initial post. Use of a statistical confidence level may provide progressive access to additional participants over time.

Additionally, a temporary circle, distribution list, or group may be created and used for both initial and subsequent additions to the distribution of a post in a social network conversation. New social network groups may also be created to further distribute posts to other social network members (e.g., other than the core social network group) to elicit more commentary from other social network users or from other social networks. These calculated groups may be stored for reuse. Clustering or grouping of individuals may be achieved by any of the following methods: frequency of communication and "inner circle" sentiment of a prior communication, expertise related to the post, groupings of individual members of the group, personal sentiment related to the topic (e.g., really like or dislike the topic), predictability in response (e.g., predictability of either a positive or negative sentiment in the absence of expertise), prior combinations of responses, clusters of prior responses, likelihood of response, trust metrics, temporal aspects, and features of the message. It should be understood that the subject matter described herein is not limited to the listing above and that other approaches to clustering or grouping are possible and may be utilized as appropriate for the respective implementation.

It should be noted that conception of the present subject matter resulted from recognition of certain limitations associated with social network conversations. For example, it was observed that because social networks allow users to comment essentially at will during all hours of days and nights, social network users often engage in conversations that evolve by a first user that sees a post often being the first user to respond. This tendency was observed to result in a form of "first in, first out" (FIFO) messaging within a social network that, while potentially efficient for messaging mechanics, may lead to dissatisfaction among social network users if certain users are more active and thereby are able more often to comment first. It was observed that because of the social nature of social networks (e.g., a lack of face-to-face feedback of how commentary is actually perceived by other group members), certain social network users may not recognize how their commentary is perceived by other users, and as a result many other users may not express their opinions if more active users are perceived to have squelched a conversation. It was determined that this dynamic nature of social network communications may lead to a lack of participation among certain social network users that also have valuable knowledge or objective and insightful contributions but that hesitate to contribute once strong responses have been entered/posted. It was determined that new technology that addresses this problem may implement a dynamic threshold for inclusion of social network users in social network conversations, by which inclusion of social network users in social network conversations may be dynamically adjusted over time, to allow less active social network users to participate earlier in social network conversations to enhance idea sharing and to avoid one-sided conversations. The present subject matter improves social network conversations and information sharing within social networks by providing for improved social network conversation focus by dynamic alteration of a threshold of inclusion of group members into the social network conversations, as described above and in more detail below. As such, improved social network conversations may be obtained through use of the present technology.

The dynamic inclusion thresholds for social network conversations described herein may be performed in real time to allow prompt threshold-based inclusion of participants to social network conversations. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for dynamic inclusion thresholds for social network conversations. A computing device_1 102 through a computing device_N 104 communicate via a network 106 with several other devices. The other devices include a server_1 108 through a server_M 110, and a database 112.

As will be described in more detail below in association with FIG. 2 through FIG. 5, the computing device_1 102 through the computing device_N 104 and/or the server_1 108 through the server_M 110 may each provide automated dynamic inclusion thresholds for social network conversations. The automated dynamic inclusion thresholds for social network conversations is based upon historical and real-time analysis of social network conversations to determine patterns of non-communication by certain group members and to increase diversity of social network conversations based upon this analysis by inclusion of group members that may otherwise not contribute to conversations under certain types of situations. The automated dynamic inclusion thresholds for social network conversations also operates to dynamically include different social network members with different or stronger opinions over time to avoid leaving those social network group members out of conversations. The present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a social network server, web server, application server, or other data server device.

The database 112 may include multiple different databases and may store social network conversation content for use by one or more social networks implemented by the server_1 108 through the server_M 110. The database 112 may include a relational database, an object database, or any other storage type of device. As such, the database 112 may be implemented as appropriate for a given implementation.

Figure 2:
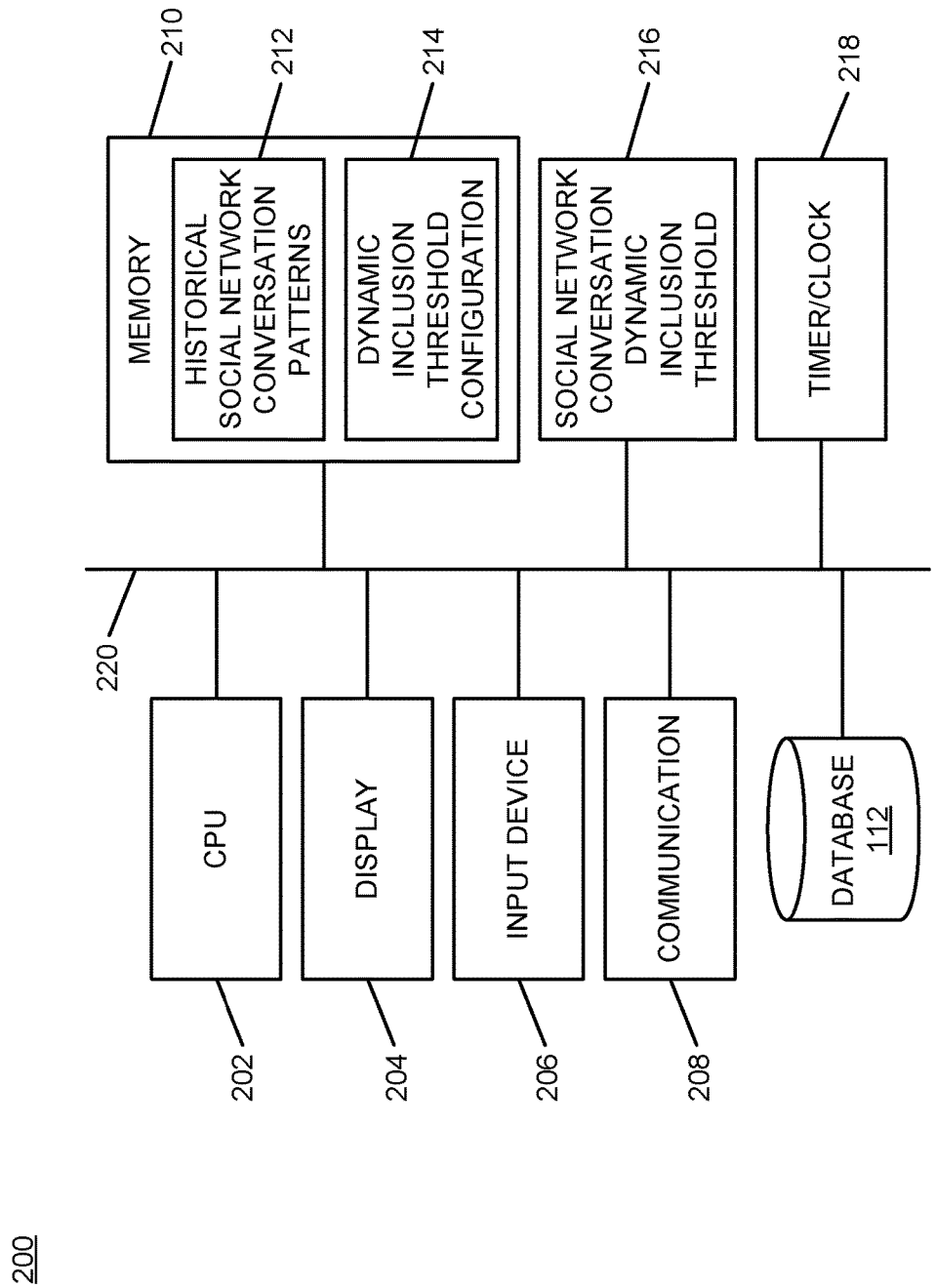
FIG. 2 is a block diagram of an example of an implementation of a core processing module capable of performing dynamic inclusion thresholds for social network conversations according to an embodiment of the present subject matter.

FIG. 2 is a block diagram of an example of an implementation of a core processing module 200 capable of performing dynamic inclusion thresholds for social network conversations. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of dynamic inclusion thresholds in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a historical social network conversation patterns storage area 212 that stores within the core processing module 200 analytical information and metrics regarding social network conversation dynamics derived over time by analysis of social network conversations. The analytical information and metrics regarding social network conversation dynamics may include response rates (or non-response rates) and other information associated with social network group members under differing conversation circumstances and/or in response to commentary by different members of social network groups. As will be described in more detail below, the analytical information and metrics regarding social network conversation dynamics stored within the historical social network conversation patterns storage area 212 is used to configure social network conversation dynamic inclusion thresholds to both include more participants in social network conversations and to include participants over time to diversify the content expressed within social network conversations.

The memory 210 also includes a dynamic inclusion threshold configuration storage area 214 that stores configured and dynamically updated social network conversation dynamic inclusion thresholds for particular social network groups, conversations, or other granularities as appropriate for a given implementation. As described above and in more detail below, the configured and dynamically updated social network conversation dynamic inclusion thresholds operate to include both persons that may otherwise not contribute to social network conversations and to include other persons that are determined to be highly likely to contribute with stronger commentary over time. As described above, the configured and dynamically updated social network conversation dynamic inclusion thresholds perform a dual role of operating to "include" members of social network groups that may otherwise not contribute to social network conversations, and by also contemporaneously operating to "include" members with particular styles of historical communication patterns to conversations over time. Both forms of inclusion may be dynamically adjusted in real time as social network conversations unfold within a social network. Accordingly, the present technology may facilitate more balanced social network conversations with an increased diversity of participants, commentary, and perspective.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A social network conversation dynamic inclusion threshold module 216 is also illustrated. The social network conversation dynamic inclusion threshold module 216 provides historical and real-time social network conversation analysis for the core processing module 200, as described above and in more detail below. The social network conversation dynamic inclusion threshold module 216 implements the automated dynamic inclusion thresholds for social network conversations of the core processing module 200.

It should also be noted that the social network conversation dynamic inclusion threshold module 216 may form a portion of other circuitry described without departure from the scope of the present subject matter. Further, the social network conversation dynamic inclusion threshold module 216 may alternatively be implemented as an application stored within the memory 210. In such an implementation, the social network conversation dynamic inclusion threshold module 216 may include instructions executed by the CPU 202 for performing the functionality described herein. The CPU 202 may execute these instructions to provide the processing capabilities described above and in more detail below for the core processing module 200. The social network conversation dynamic inclusion threshold module 216 may form a portion of an interrupt service routine (ISR), a portion of an operating system, a portion of a browser application, or a portion of a separate application without departure from the scope of the present subject matter.

A timer/clock module 218 is illustrated and used to determine timing and date information, such as monitoring response timing of posts of social network conversations and satisfaction of time-based dynamic inclusion thresholds, as described above and in more detail below. As such, the social network conversation dynamic inclusion threshold module 216 may utilize information derived from the timer/clock module 218 for information processing activities, such as the dynamic inclusion thresholds for social network conversations.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the social network conversation dynamic inclusion threshold module 216, the timer/clock module 218, and the database 112 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor (s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
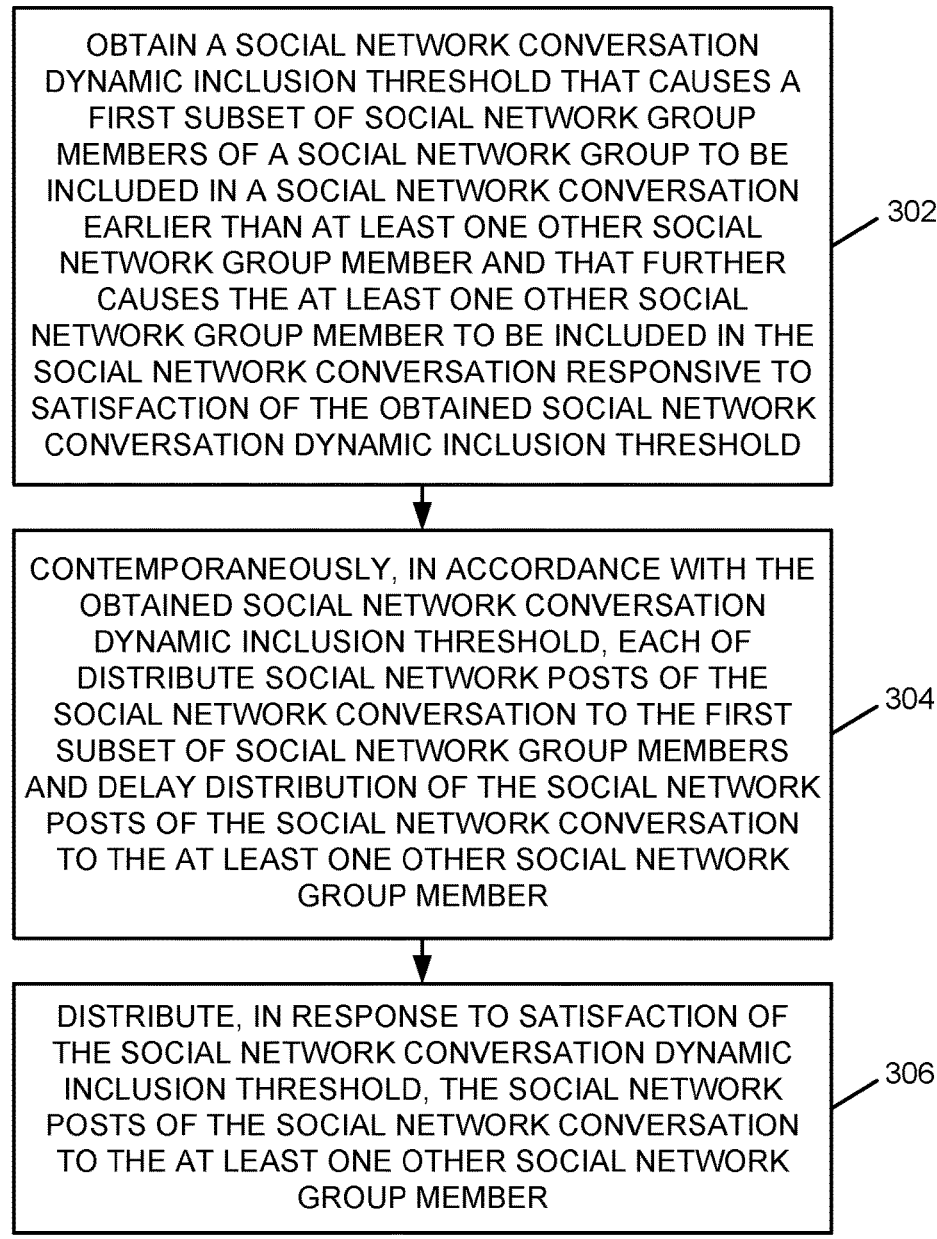
FIG. 3 is a flow chart of an example of an implementation of a process for dynamic inclusion thresholds for social network conversations according to an embodiment of the present subject matter.
Figure 4:
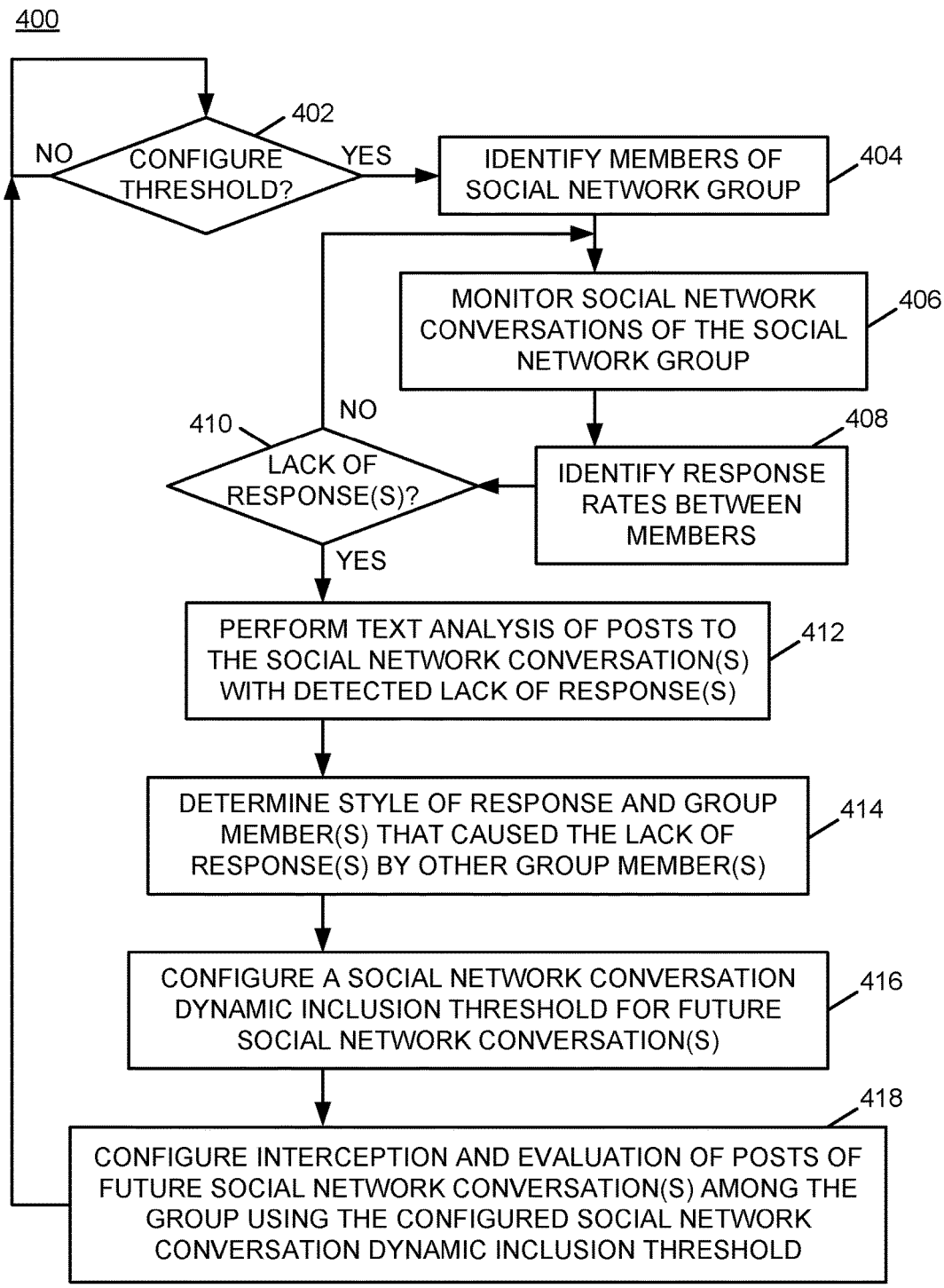
FIG. 4 is a flow chart of an example of an implementation of a process for configuration of dynamic inclusion thresholds for social network conversations according to an embodiment of the present subject matter.
Figure 5:
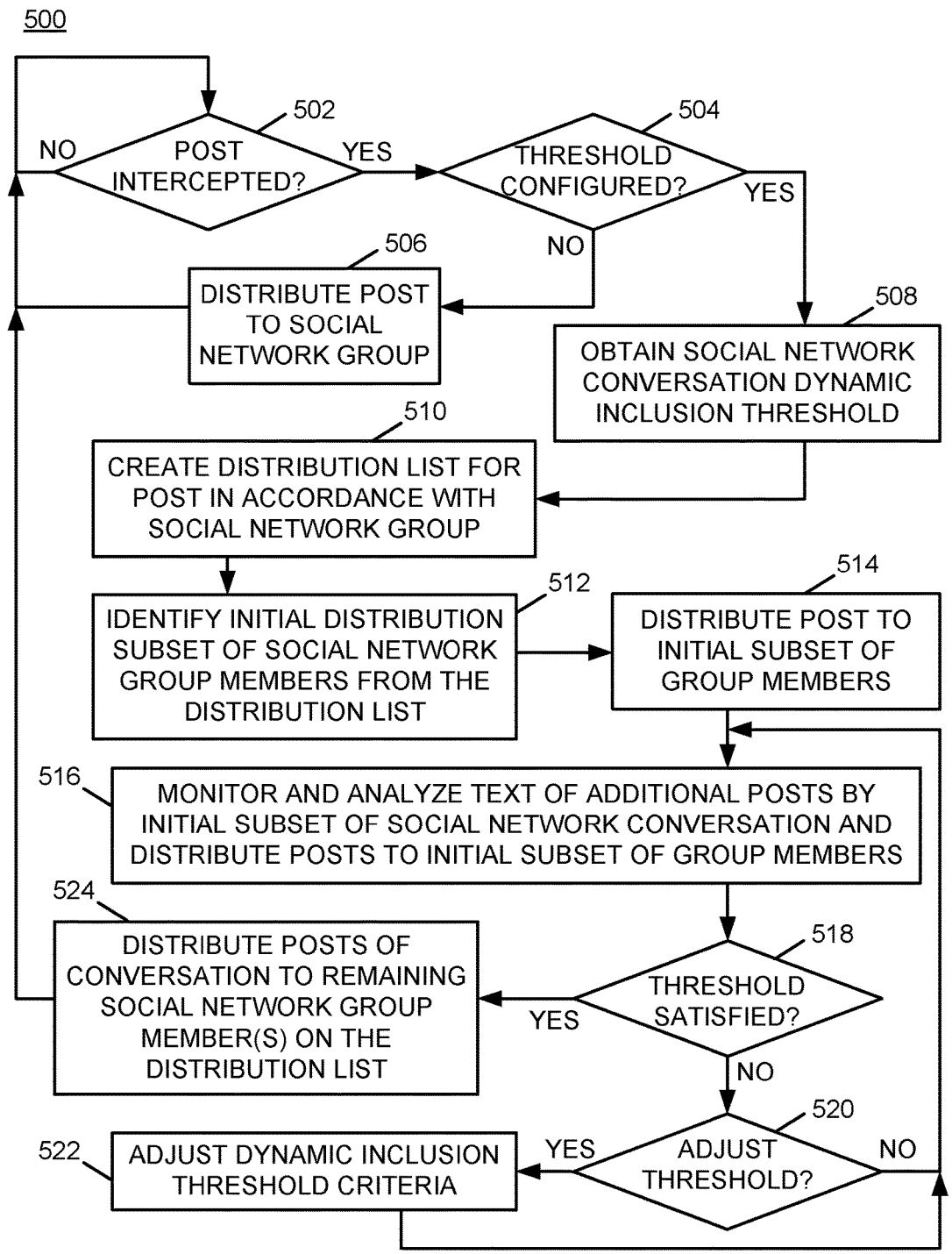
FIG. 5 is a flow chart of an example of an implementation of a process for performing and dynamically adjusting dynamic inclusion thresholds for social network conversations according to an embodiment of the present subject matter.

FIG. 3 through FIG. 5 described below represent example processes that may be executed by devices, such as the core processing module 200, to perform the automated dynamic inclusion thresholds for social network conversations associated with the present subject matter. Many other variations on the example processes are possible and all are considered within the scope of the present subject matter. The example processes may be performed by modules, such as the social network conversation dynamic inclusion threshold module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for dynamic inclusion thresholds for social network conversations. The process 300 represents a computer-implemented method of performing the dynamic inclusion thresholds for social network conversations described herein. At block 302, the process 300 obtains a social network conversation dynamic inclusion threshold that causes a first subset of social network group members of a social network group to be included in a social network conversation earlier than at least one other social network group member and that further causes the at least one other social network group member to be included in the social network conversation responsive to satisfaction of the obtained social network conversation dynamic inclusion threshold. At block 304, the process 300 contemporaneously, in accordance with the obtained social network conversation dynamic inclusion threshold, each of distributes social network posts of the social network conversation to the first subset of social network group members and delays distribution of the social network posts of the social network conversation to the at least one other social network group member. At block 306, the process 300 distributes, in response to satisfaction of the social network conversation dynamic inclusion threshold, the social network posts of the social network conversation to the at least one other social network group member.

FIG. 4 is a flow chart of an example of an implementation of a process 400 for configuration of dynamic inclusion thresholds for social network conversations. The process 400 represents a computer-implemented method of configuring the dynamic threshold-based inclusion for social network conversations described herein. At decision point 402, the process 400 makes a determination as to whether a request to configure a social network conversation dynamic inclusion threshold has been detected. A request to configure a social network conversation dynamic inclusion threshold may be detected, for example, in response to a user request or otherwise as appropriate for a given implementation and may identify one or more social network groups for which to configure a social network conversation dynamic inclusion threshold. For purposes of the description below, it is presumed that one social network group has been identified for configuration of a social network conversation dynamic inclusion threshold, though additional processing to configure social network conversation dynamic inclusion thresholds for multiple social network groups may be performed by iteration through the appropriate processing steps described below and with any additional steps appropriate for a given implementation.

In response to determining that a request to configure a social network conversation dynamic inclusion threshold has been detected, the process 400 identifies members of the social network group for which the request to configure a social network conversation dynamic inclusion threshold has been detected at block 404. At block 406, the process 400 monitors social network conversations of the identified social network group members. It should be noted that the monitoring of conversations of the identified social network group members may be performed by analysis of previous social network conversations to expedite configuration of the social network conversation dynamic inclusion threshold, or may be performed by monitoring future conversations over time subsequent to the request to configure the social network conversation dynamic inclusion threshold.

At block 408, the process 400 identifies response rates between members. The identification of the response rates between members may be further refined based upon topic, time of day, or other factors as appropriate for a given implementation to allow a determination of changes in response rates based upon opinions expressed during different conversations and other factors usable to configure the social network conversation dynamic inclusion threshold.

At decision point 410, the process 400 makes a determination as to whether one or more lack of responses has been identified. The lack of response(s) may be identified across multiple conversations to determine whether one or more social network group members normally respond to social network conversations, but do not respond under certain identifiable situations/conditions. The respective identifiable situations/conditions that result in the group members not responding may also be identified, including relationships between individual group members and other situations/conditions.

In response to determining at decision point 410 that one or more lack of responses has not been identified, the process 400 returns to block 406 and continues monitoring the social network conversations of the social network group. Alternatively, in response to determining at decision point 410 that one or more lack of responses has been identified, the process 400 performs text analysis of posts to the social network conversation(s) with the detected lack of response(s) at block 412. As described above, content of social network conversations that prematurely terminate may be suggestive of commentary that causes other group members not to comment or not to continue in a social network conversation. As such, the process 400 may identify these types of text commentary that result in social network conversations terminating without the intended amount of objective, diverse, and balanced commentary.

At block 414, the process 400 determines a style of response and group member(s) that cause the lack of response(s) by the other group member(s). At block 416, the process 400 configures a social network conversation dynamic inclusion threshold for one or more future social network conversation(s). The configured social network conversation dynamic inclusion threshold may be based upon a topic or subject of conversation(s), time, number of responses/non-responses, responses/non-responses by particular members, and other factors consistent with the present description.

At block 418, the process 400 configures interception and evaluation of posts of future social network conversation(s) among the social network group using the configured social network conversation dynamic inclusion threshold. For purposes of the present description, posts to be intercepted and evaluated may include any form of messages including social network posts, emails, text messages, instant messages (IM), short message service (SMS) messages, blog posts, website posts associated with online social communities, news feeds, and other forms of messages as appropriate for a given implementation. The process 400 returns to decision point 402 and iterates as described above.

As such, the process 400 analyzes social network conversations, identifies situations in which certain group members do not respond where they would otherwise historically respond, and identifies these situations as a lack of response to be evaluated. The process 400 further performs text analysis of the identified lack of response, determines a style of response that caused the lack of response, and configures and deploys a social network conversation dynamic inclusion threshold.

FIG. 5 is a flow chart of an example of an implementation of a process 500 for performing and dynamically adjusting dynamic inclusion thresholds for social network conversations. The process 500 represents a computer-implemented method of performing the dynamic threshold-based inclusion for social network conversations described herein. The process 500 is depicted and described as a per-conversation process, though additional processing to perform processing of multiple contemporaneous conversations (e.g., by multi-threaded operation) may be utilized as appropriate for a given implementation. Additionally, as described above, for purposes of the present description, posts to be intercepted and evaluated include any form of messages including social network posts, emails, text messages, and other forms of messages as appropriate for a given implementation. The post may additionally be considered a first post in a thread or any intermediate post for which a conversation has been configured with one or more social network conversation dynamic inclusion thresholds.

At decision point 502, the process 500 make a determination as to whether a post associated with a social network conversation has been intercepted. In response to determining that a post has been intercepted, the process 500 makes a determination at decision point 504 as to whether a social network conversation dynamic inclusion threshold has been configured for the post, such as being configured in association with the social network group member that generated the post or with the social network group associated with the social network group member. In response to determining that a social network conversation dynamic inclusion threshold has not been configured for the post, the process 500 distributes the post to the social network group with which the post is associated at block 506, and the process 500 returns to decision point 502 and iterates as described above.

Alternatively, in response to determining at decision point 504 that a social network conversation dynamic inclusion threshold has been configured for the post, the process 500 obtains the configured social network conversation dynamic inclusion threshold at block 508. At block 510, the process 500 creates a distribution list for the post in accordance with the respective social network group. Creation of the distribution list for the post in accordance with the respective social network group may be performed using options described above for clustering and grouping, or otherwise as appropriate for the given implementation. At block 512, the process 500 identifies an initial distribution subset of social network group members to which the post may initially be distributed from the distribution list. The initial selected distribution subset of social network group members may be derived based upon group members from which historical responses are determined to be lacking (e.g., due potentially to dominant responses from other members of the group, based upon being users involved primarily with different aspects of a subject matter area within the group, etc.). Group members that are not in the initial selected distribution subset may be included in the social network conversation at a later time. As such, the initial selected distribution subset may be selected in accordance with differences in subject matter experience among the social network group members in the initial selected distribution subset of social network group members. Additionally, the initial selected distribution subset may be selected in accordance with similarities in subject matter interest, such as selection of the initial distribution subset according to group members with a first user interest profile that matches a first subject, with inclusion at a later time of users with a second user interest profile that matches a second subject.

At block 514, the process 500 distributes the post to the initial distribution subset of group members on the distribution list. At block 516, the process 500 monitors and analyzes text of additional intercepted posts of the social network conversation and distributes the additional intercepted posts to the initial distribution subset of group members.

At decision point 518, the process 500 makes a determination, based upon the text analysis of the intercepted posts and/or other criteria (e.g., timeouts), as to whether a configured social network conversation dynamic inclusion threshold has been satisfied for the social network conversation. As described above, the configured social network conversation dynamic inclusion threshold may include an amount of time passing since the intercepted post (e.g., a timeout, such as one minute, one hour, one day, etc.), quality and diversity of responses, sentiment of responses, attainment of a meta-threshold (e.g., there have been ten new posts, specific people have joined the conversation, etc.), a number of responses or rate of responses increasing or decreasing, a sentiment threshold (more positive responses than negative responses, etc.), subject matter drift, negativity tolerance criteria, age of posts, thread size, or other threshold, as appropriate for a given implementation.

In response to determining that the configured social network conversation dynamic inclusion threshold has not been satisfied at decision point 518, the process 500 makes a determination at decision point 520 as to whether to adjust the configured social network conversation dynamic inclusion threshold. Adjustment of the configured social network conversation dynamic inclusion threshold may be performed over time, for example, responsive to determining that the social network conversation dynamic inclusion threshold has not been satisfied in a reasonably timely manner, such as where the social network conversation has become idle prior to any configured timeout within the social network conversation dynamic inclusion threshold or where some other factor is suggestive that the social network conversation dynamic inclusion threshold has been over constrained. As such, adjusting the social network conversation dynamic inclusion threshold operates as a social network post distribution feedback mechanism to adjust distribution of social network posts and may assist with ensuring that intercepted posts get distributed to all group members in a timely manner in circumstances where a particular conversation becomes idle and the social network conversation dynamic inclusion threshold may not be reached or for other reasons as appropriate for a given implementation.

In response to determining not to adjust the configured social network conversation dynamic inclusion threshold at decision point 520, the process 500 returns to block 516 and continues to monitor and analyze text of additional posts of the social network conversation. Alternatively, in response to determining to adjust the configured social network conversation dynamic inclusion threshold at decision point 520, the process 500 adjusts the social network conversation dynamic inclusion threshold at block 522, and returns to block 516 and continues to monitor and analyze text of additional posts of the social network conversation.

Returning to the description of decision point 518, in response to determining that the configured social network conversation dynamic inclusion threshold has been satisfied, the process 500 distributes the posts of the social network conversation to the remaining one or more social network group members on the distribution list at block 524. The process 500 returns to decision point 502 and iterates as described above.

As such, the process 500 operates to intercept either initial or intermediate social network conversation posts, and to identify an initial distribution subset of social network group members for initial inclusion in distribution of the post. The process 500 distributes the post to the initial distribution subset of group members, and intercepts and monitors over time additional posts posted responsive to the intercepted post. The posts are analyzed for content and distributed to the initial distribution subset of group members. The process 500 evaluates one or more configured social network conversation dynamic inclusion thresholds, and adjusts the configured thresholds as appropriate for the particular thresholds and subsequent post content. In response to one or more of the configured social network conversation dynamic inclusion thresholds being satisfied, the remaining social network group members on the distribution list are included in the social network conversation and all posts associated with the conversation are distributed to the remaining social network group members.

As described above in association with FIG. 1 through FIG. 5, the example systems and processes provide dynamic inclusion thresholds for social network conversations. Many other variations and additional activities associated with dynamic inclusion thresholds for social network conversations are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
   distributing, by a computing device in accordance with a social network conversation dynamic inclusion threshold that causes a first subset of social network group members of a social network group to be included in a social network conversation earlier than at least one other social network group member, social network posts of the social network conversation to the first subset of social network group members while delaying distribution of the social network posts of the social network conversation to the at least one other social network group member; and
   distributing, by the computing device in response to satisfaction of the social network conversation dynamic inclusion threshold, the social network posts of the social network conversation to the at least one other social network group member.

2. The computer-implemented method of claim 1, further comprising the computing device configuring the social network conversation dynamic inclusion threshold responsive to determining, by text analysis over time of commentary in social network conversations by social network group members of the social network group, that at least one group member of the social network contributes to the social network conversations less often when a particular style of commentary is expressed by the at least one other social network group member.

3. The computer-implemented method of claim 1, further comprising the computing device:
   intercepting a social network post of the social network conversation;
   creating a distribution list for posts of the social network conversation in accordance with the social network group;
   identifying the first subset of social network group members as an initial distribution subset of the social network group members; and
   where distributing, by the computing device in accordance with the social network conversation dynamic inclusion threshold that causes the first subset of social network group members of the social network group to be included in the social network conversation earlier than the at least one other social network group member, the social network posts of the social network conversation to the first subset of social network group members while delaying the distribution of the social network posts of the social network conversation to the at least one other social network group member comprises the computing device:
   contemporaneously distributing the intercepted social network post and additional intercepted social network posts of the social network conversation to the initial distribution subset of the social network group members on the distribution list, while delaying distribution of the intercepted social network post and the additional intercepted social network posts of the social network conversation to other social network group members of the social network group on the distribution list.

4. The computer-implemented method of claim 1, further comprising the computing device:
   intercepting, prior to delivery to social network group members, the social network posts of the social network conversation;
   analyzing text of the intercepted social network posts of the social network conversation; and
   determining, based upon the text analysis of the intercepted social network posts, that the social network conversation dynamic inclusion threshold has been satisfied for the social network conversation.

5. The computer-implemented method of claim 1, further comprising the computing device adjusting, as social network post distribution feedback, the social network conversation dynamic inclusion threshold responsive to determining that the social network conversation dynamic inclusion threshold has been over constrained.

6. The computer-implemented method of claim 1, further comprising the computing device selecting the first subset of social network group members in accordance with one of:
   differences in subject matter experience among social network group members in the first subset of social network group members; and
   similarities in subject matter interest.

7. The computer-implemented method of claim 1, where the social network conversation dynamic inclusion threshold comprises at least one criterion selected from a group consisting of: an elapsed amount of time, a quality of responses, a diversity of opinions expressed within responses, sentiment distribution of responses, attainment of a specified quantity of responses, specific social network group members joining the social network conversation, a detected positive or negative change in a rate of responses, subject matter drift, age of posts, and thread size.

8. A system, comprising:
   a memory; and
   a hardware-based processor programmed to:
   distribute, in accordance with a social network conversation dynamic inclusion threshold that causes a first subset of social network group members of a social network group to be included in a social network conversation earlier than at least one other social network group member, social network posts of the social network conversation to the first subset of social network group members while delaying distribution of the social network posts of the social network conversation to the at least one other social network group member; and
   distribute, in response to satisfaction of the social network conversation dynamic inclusion threshold, the social network posts of the social network conversation to the at least one other social network group member.

9. The system of claim 8, where the hardware-based processor is further programmed to configure the social network conversation dynamic inclusion threshold responsive to determining, by text analysis over time of commentary in social network conversations by social network group members of the social network group, that at least one group member of the social network contributes to the social network conversations less often when a particular style of commentary is expressed by the at least one other social network group member.

10. The system of claim 8, where the hardware-based processor is further programmed to:
intercept a social network post of the social network conversation;
create a distribution list for posts of the social network conversation in accordance with the social network group;
identify the first subset of social network group members as an initial distribution subset of the social network group members; and
where in being programmed to distribute, in accordance with the social network conversation dynamic inclusion threshold that causes the first subset of social network group members of the social network group to be included in the social network conversation earlier than the at least one other social network group member, the social network posts of the social network conversation to the first subset of social network group members while delaying the distribution of the social network posts of the social network conversation to the at least one other social network group member, the hardware-based processor is programmed to:
contemporaneously distribute the intercepted social network post and additional intercepted social network posts of the social network conversation to the initial distribution subset of the social network group members on the distribution list, while delaying distribution of the intercepted social network post and the additional intercepted social network posts of the social network conversation to other social network group members of the social network group on the distribution list.

11. The system of claim 8, where the hardware-based processor is further programmed to:
intercept, prior to delivery to social network group members, the social network posts of the social network conversation;
analyze text of the intercepted social network posts of the social network conversation; and
determine, based upon the text analysis of the intercepted social network posts, that the social network conversation dynamic inclusion threshold has been satisfied for the social network conversation.

12. The system of claim 8, where the hardware-based processor is further programmed to adjust, as social network post distribution feedback, the social network conversation dynamic inclusion threshold responsive to determining that the social network conversation dynamic inclusion threshold has been over constrained.

13. The system of claim 8, where the hardware-based processor is further programmed to select the first subset of social network group members in accordance with one of:
differences in subject matter experience among social network group members in the first subset of social network group members; and
similarities in subject matter interest; and
where the social network conversation dynamic inclusion threshold comprises at least one criterion selected from a group consisting of: an elapsed amount of time, a quality of responses, a diversity of opinions expressed within responses, sentiment distribution of responses, attainment of a specified quantity of responses, specific social network group members joining the social network conversation, a detected positive or negative change in a rate of responses, subject matter drift, age of posts, and thread size.

14. A computer program product, comprising:
a computer readable storage medium having computer readable program code embodied therewith, where the computer readable storage medium is not a transitory signal per se and where the computer readable program code when executed on a computer device causes the computer device to:
distribute, in accordance with a social network conversation dynamic inclusion threshold that causes a first subset of social network group members of a social network group to be included in a social network conversation earlier than at least one other social network group member, social network posts of the social network conversation to the first subset of social network group members while delaying distribution of the social network posts of the social network conversation to the at least one other social network group member; and
distribute, in response to satisfaction of the social network conversation dynamic inclusion threshold, the social network posts of the social network conversation to the at least one other social network group member.

15. The computer program product of claim 14, where the computer readable program code when executed on the computer device further causes the computer device to configure the social network conversation dynamic inclusion threshold responsive to determining, by text analysis over time of commentary in social network conversations by social network group members of the social network group, that at least one group member of the social network contributes to the social network conversations less often when a particular style of commentary is expressed by the at least one other social network group member.

16. The computer program product of claim 14, where the computer readable program code when executed on the computer device further causes the computer device to:
intercept a social network post of the social network conversation;
create a distribution list for posts of the social network conversation in accordance with the social network group;
identify the first subset of social network group members as an initial distribution subset of the social network group members; and
where, in causing the computer device to distribute, in accordance with the social network conversation dynamic inclusion threshold that causes the first subset of social network group members of the social network group to be included in the social network conversation earlier than the at least one other social network group member, the social network posts of the social network conversation to the first subset of social network group members while delaying the distribution of the social network posts of the social network conversation to the at least one other social network group member, the computer readable program code when executed on the computer device causes the computer device to:
contemporaneously distribute the intercepted social network post and additional intercepted social network posts of the social network conversation to the initial distribution subset of the social network group members on the distribution list, while delaying distribution of the intercepted social network post and the additional intercepted social network posts of the social network conversation to other social network group members of the social network group on the distribution list.

17. The computer program product of claim 14, where the computer readable program code when executed on the computer device further causes the computer device to:
   intercept, prior to delivery to social network group members, the social network posts of the social network conversation;
   analyze text of the intercepted social network posts of the social network conversation; and
   determine, based upon the text analysis of the intercepted social network posts, that the social network conversation dynamic inclusion threshold has been satisfied for the social network conversation.

18. The computer program product of claim 14, where the computer readable program code when executed on the computer device further causes the computer device to adjust, as social network post distribution feedback, the social network conversation dynamic inclusion threshold responsive to determining that the social network conversation dynamic inclusion threshold has been over constrained.

19. The computer program product of claim 14, where the computer readable program code when executed on the computer device further causes the computer device to select the first subset of social network group members in accordance with one of:
   differences in subject matter experience among social network group members in the first subset of social network group members; and
   similarities in subject matter interest.

20. The computer program product of claim 14, where the social network conversation dynamic inclusion threshold comprises at least one criterion selected from a group consisting of: an elapsed amount of time, a quality of responses, a diversity of opinions expressed within responses, sentiment distribution of responses, attainment of a specified quantity of responses, specific social network group members joining the social network conversation, a detected positive or negative change in a rate of responses, subject matter drift, age of posts, and thread size.

* * * * *